United States Patent
Haba et al.

(10) Patent No.: US 7,384,061 B2
(45) Date of Patent: Jun. 10, 2008

(54) TRIM PANEL AND A METHOD OF MANUFACTURE

(75) Inventors: Charles Haba, Troy, MI (US); Robert J. Adams, Ypsilanti, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 281 days.

(21) Appl. No.: 11/160,889

(22) Filed: Jul. 14, 2005

(65) Prior Publication Data

US 2007/0013172 A1  Jan. 18, 2007

(51) Int. Cl.
*B60R 21/215* (2006.01)

(52) U.S. Cl. .................................... 280/728.3
(58) Field of Classification Search ............ 280/728.3, 280/732; 264/139, 255
See application file for complete search history.

(56) References Cited

U.S. PATENT DOCUMENTS

| | | | |
|---|---|---|---|
| 5,082,310 A * | 1/1992 | Bauer ........................... 280/732 |
| 5,108,128 A | 4/1992 | Parker et al. |
| 5,174,602 A * | 12/1992 | Nakayama et al. ......... 280/728.3 |
| 5,180,187 A * | 1/1993 | Muller et al. ............... 280/732 |
| 5,316,822 A * | 5/1994 | Nishijima et al. .......... 428/138 |
| 5,447,328 A * | 9/1995 | Iannazzi et al. ........... 280/728.3 |
| 5,611,564 A * | 3/1997 | Bauer ......................... 280/728.3 |
| 5,632,914 A | 5/1997 | Hagenow et al. |
| 5,698,283 A * | 12/1997 | Yamasaki et al. ............ 428/43 |
| 5,762,362 A * | 6/1998 | Kikuchi et al. ............ 280/728.3 |
| 5,779,262 A * | 7/1998 | Totani et al. ............... 280/728.3 |
| 5,839,752 A * | 11/1998 | Yamasaki et al. ........... 280/728.3 |
| 5,863,064 A * | 1/1999 | Rheinlander et al. ....... 280/732 |
| 5,883,356 A * | 3/1999 | Bauer et al. ............... 219/121.62 |
| 5,913,534 A * | 6/1999 | Klingauf ................... 280/728.3 |
| 5,957,483 A * | 9/1999 | Miltenberger et al. .... 280/728.3 |
| 5,957,484 A | 9/1999 | Levine et al. |
| 5,961,143 A * | 10/1999 | Hlywka et al. ........... 280/728.3 |
| 5,989,479 A * | 11/1999 | Yamasaki et al. ........... 264/510 |
| 6,001,295 A * | 12/1999 | Yamamoto ................. 264/296 |
| 6,113,131 A * | 9/2000 | Uehara et al. ............ 280/728.3 |
| 6,337,461 B1 * | 1/2002 | Yasuda et al. ........... 219/121.62 |
| RE37,540 E * | 2/2002 | Iannazzi et al. .......... 280/728.3 |
| 6,402,189 B1 * | 6/2002 | Gray et al. ................ 280/728.3 |
| 6,443,484 B2 * | 9/2002 | Anglsperger ............. 280/728.3 |
| 6,505,850 B2 * | 1/2003 | Helfrich et al. ........... 280/728.3 |
| 6,657,158 B1 | 12/2003 | Skelly et al. |
| 6,726,239 B1 * | 4/2004 | Teranishi et al. ......... 280/728.3 |

(Continued)

FOREIGN PATENT DOCUMENTS

DE  196 53 512 A1  6/1997

(Continued)

*Primary Examiner*—Eric Culbreth
*Assistant Examiner*—Karen Jane J. Amores
(74) *Attorney, Agent, or Firm*—Brooks Kushman P.C.

(57) ABSTRACT

A trim panel for a motor vehicle and a method of manufacture. The trim panel includes a first layer and a second layer. The first layer includes a first surface and a second surface having an indentation. The second layer includes a third surface and a fourth surface. The third surface is disposed adjacent to the second surface and includes a protrusion disposed adjacent to the indentation and an aperture disposed proximate the protrusion. The protrusion concentrates force against the indentation to sever the first layer when sufficient force is applied to the fourth surface.

20 Claims, 4 Drawing Sheets

U.S. PATENT DOCUMENTS

| | | |
|---|---|---|
| 7,093,849 B2 * | 8/2006 | Nishijima et al. ....... 280/728.3 |
| 7,100,941 B2 * | 9/2006 | Riha et al. ............... 280/728.3 |
| 7,229,095 B2 * | 6/2007 | Nishijima et al. .......... 280/732 |
| 2001/0011811 A1 * | 8/2001 | Takahashi et al. ....... 280/728.3 |
| 2002/0079677 A1 * | 6/2002 | Skirha et al. ............ 280/728.3 |
| 2004/0056455 A1 * | 3/2004 | Nishijima et al. ....... 280/728.3 |
| 2004/0119268 A1 | 6/2004 | Davis, Jr. et al. |
| 2004/0164531 A1 | 8/2004 | Riha et al. |
| 2004/0183279 A1 | 9/2004 | DePue et al. |
| 2004/0183280 A1 | 9/2004 | Gray et al. |
| 2004/0222619 A1 | 11/2004 | DePue et al. |
| 2004/0232668 A1 | 11/2004 | DePue et al. |
| 2006/0061070 A1 * | 3/2006 | Maertens ................. 280/728.3 |
| 2006/0138751 A1 * | 6/2006 | Matsuno ................. 280/728.3 |
| 2006/0202447 A1 * | 9/2006 | Sawada ................... 280/728.3 |
| 2006/0202448 A1 * | 9/2006 | Sawada et al. .......... 280/728.3 |
| 2006/0237952 A1 * | 10/2006 | Cvengros ................. 280/728.3 |
| 2007/0013172 A1 * | 1/2007 | Haba et al. .............. 280/728.3 |
| 2007/0018434 A1 * | 1/2007 | Hayashi ................... 280/728.3 |

FOREIGN PATENT DOCUMENTS

| | | |
|---|---|---|
| DE | 196 46 548 A1 | 5/1998 |
| DE | 197 18 931 C1 | 8/1998 |
| DE | 195 81 573 C1 | 12/1998 |
| DE | 101 33 968 A1 | 2/2003 |
| DE | 101 35 224 A1 | 2/2003 |
| GB | 2 287 226 A | 9/1995 |
| WO | WO 92/17351 | 10/1992 |

* cited by examiner

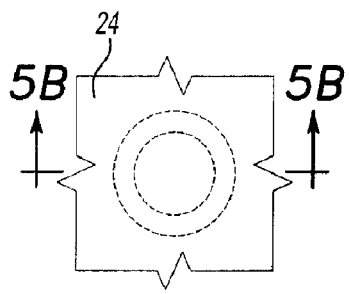
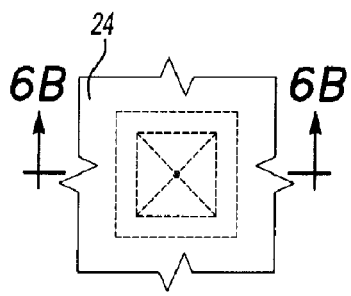
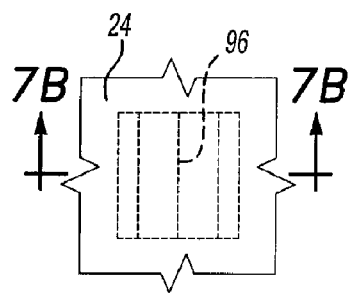
Fig-5A  Fig-6A  Fig-7A
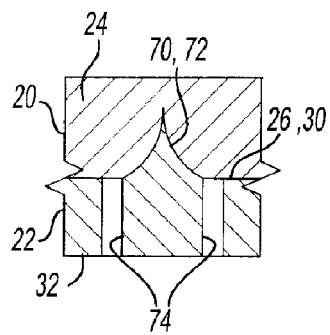
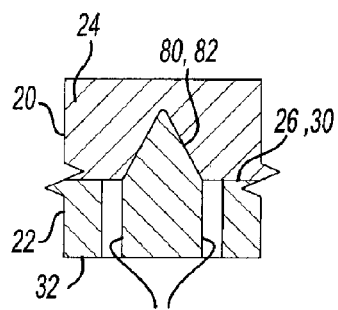
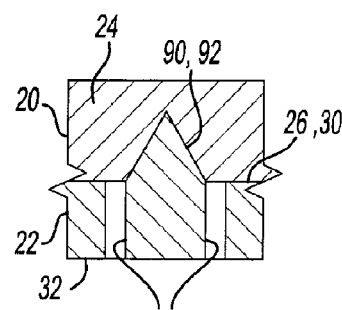
Fig-5B  Fig-6B  Fig-7B
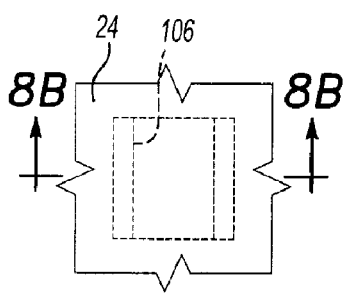
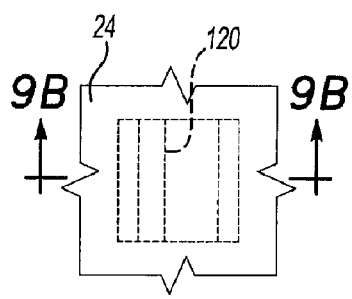
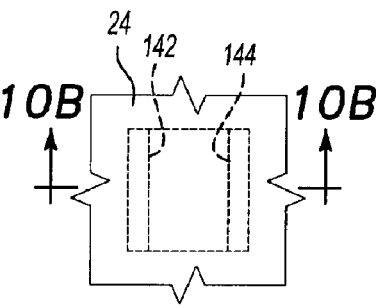
Fig-8A  Fig-9A  Fig-10A
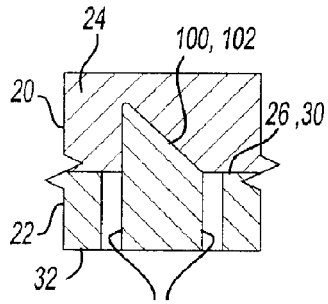
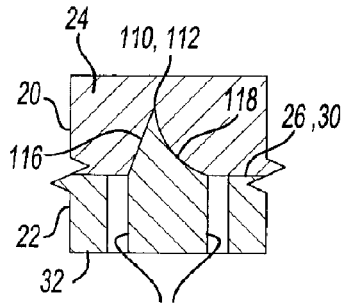
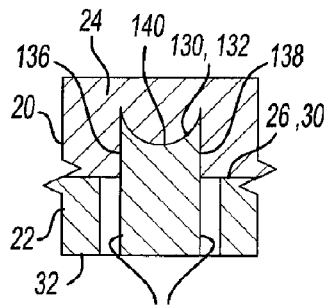
Fig-8B  Fig-9B  Fig-10B

TRIM PANEL AND A METHOD OF MANUFACTURE

BACKGROUND OF THE INVENTION

Field of the Invention

The present invention relates to a trim panel for a motor vehicle and a method of making a trim panel.

SUMMARY OF THE INVENTION

In at least one embodiment of the present invention, a trim panel for a motor vehicle is provided. The trim panel includes a first layer and a second layer. The first layer includes a first surface and a second surface disposed opposite the first surface. The second surface has an indentation extending toward and spaced apart from the first surface. The second layer includes a third surface and a fourth surface disposed opposite the third surface. The third surface is disposed adjacent to the second surface and includes a protrusion disposed adjacent to the indentation and an aperture disposed proximate the indentation. The protrusion concentrates force against the indentation to sever the first layer when sufficient force is applied to the fourth surface.

In at least one other embodiment of the present invention, a trim panel for a motor vehicle is provided. The trim panel includes a first layer and a second layer. The first layer includes a first surface that forms an exterior surface of the trim panel and a second surface disposed opposite the first surface. The second surface has an indentation extending toward and spaced apart from the first surface. The second layer includes a third surface, a fourth surface, and an aperture. The third surface is disposed adjacent to the second surface and includes a protrusion that mates with the indentation. The fourth surface is disposed opposite the third surface. The aperture extends from the fourth surface toward the third surface and is disposed near the protrusion. The protrusion concentrates force against the indentation to sever the first layer when sufficient force is applied to the fourth surface.

In at least one other embodiment of the present invention, a method for making a trim panel having a tear seam is provided. The method includes molding a first layer having a first surface and a second surface, molding a second layer having a third surface that includes a protrusion that extends into the second surface to form an indentation and a fourth surface disposed opposite the third surface, and providing an aperture in the second layer near the protrusion that extends from the fourth surface toward the third surface.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
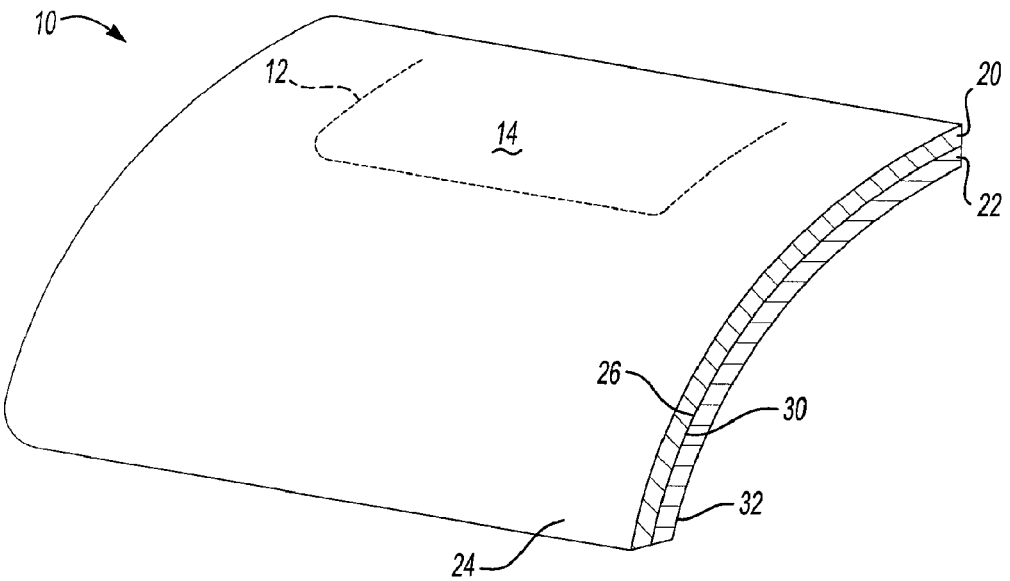
FIG. 1 is a perspective view of an exemplary trim panel having a tear seam.

Referring to FIG. 1, a trim panel 10 for a motor vehicle is shown. The trim panel 10 may be disposed in a passenger compartment of the vehicle and may form an interior vehicle surface.

The trim panel 10 may be adapted to at least partially conceal an airbag module that is adapted to deploy an airbag in response to a predicted or actual vehicle impact event. Moreover, the trim panel 10 may include one or more frangible portions or tear seams 12 that are adapted to tear, sever, or otherwise disengage when sufficient force is applied by an airbag or other component to permit the airbag to expand into the vehicle passenger compartment. The trim panel 10 may be disposed in any suitable location. For instance, the trim panel 10 may be associated with a front airbag module or a side impact protection system, such as a side airbag or side curtain airbag. As such, the trim panel 10 may be disposed proximate an instrument panel, steering wheel, seat assembly, headliner, B-pillar, or other vehicle interior component.

The tear seam 12 may have any suitable configuration. For instance, the tear seam 12 may have a linear or nonlinear arrangement. For instance, the tear seam 12 may be provided in a variety of configurations, including, but not limited to an H-shaped, I-shaped, or U-shaped arrangement. In the embodiment shown in FIG. 1, the tear seam 12 has a U-shaped arrangement that helps define at least a portion of a deployment door 14 that may open into the vehicle passenger compartment when the airbag is deployed.

The trim panel 10 may have any suitable configuration and may include a plurality of layers. In the at least one embodiment, such as the exemplary embodiment shown in FIG. 1, the trim panel 10 includes a first layer 20 and a second layer 22.

The first layer 20 may be made of any suitable material, such as a polymeric material like a thermoplastic elastomer (TPE). The first layer 20 may have any suitable configuration. In at least one embodiment, the first layer 20 may include a first surface 24 and a second surface 26 disposed opposite the first surface 24. The first surface 24 may form an exterior or visible surface, also called an "A-surface" of the trim panel 10. As such, the first surface 24 may be generally smooth or may be at least partially textured to provide a desired appearance. In addition, at least a portion of the first and second surfaces 24,26 may be disposed substantially parallel to each other. The second surface 26 may include one or more indentations that extend toward and may be spaced apart from the first surface 24 as will be described in more detail below. The one or more indentations may be spaced apart from the first surface 24 by any suitable amount, such as in the range of approximately 0.25 mm to 1.0 mm The second layer 22 may be made of any suitable material, such as a polymeric material like a thermoplastic olefin (TPO). The second layer 22 may have any suitable configuration. In at least one embodiment, the second layer 22 may include a third surface 30 and a fourth surface 32 disposed opposite the third surface 30. The third surface 30 may be disposed adjacent to and in contact with the second surface 26. In addition, at least a portion of the third and fourth surfaces 30,32 may be disposed substantially parallel to each other.

The third surface 30 may include one or more protrusions that extend away from the fourth surface 32 and are disposed adjacent to and mate with one or more of the indentations as will be described in more detail below. The one or more protrusions may help concentrate force that is applied to the fourth surface 32 to facilitate severing or disengagement of the first layer 20. In addition, the one or more protrusions may be integrally formed with the second layer 22 or may be provided separately.

The third surface 30 may also include one or more apertures disposed near one or more protrusions. The apertures may extend from the fourth surface 32 toward the third surface 30. In at least one embodiment, one or more of the apertures may extend between the third and fourth surfaces 30,32, thereby passing through the second layer 22.

Referring to FIGS. 2A-2B through 11A-11B, various exemplary embodiments of a portion of the tear seam 12 are shown. The figures ending in the letter A are plan views, while the figures ending in the letter B are section views. Although each embodiment is described separately below, the trim panel 10 may include a combination of one or more of these embodiments.

In each embodiment, one or more indentations, one or more protrusions, and one or more apertures may cooperate to define the tear seam 12. If a set of indentations, set of protrusions, or set of apertures having a plurality of members is provided, the quantity, spacing, size, and orientation of the members of each set may be selected as appropriate depending on curvature, materials, and/or design criteria (e.g., airbag deployment forces) associated with the trim panel 10. In addition, the one or more apertures may extend partially or completely through the second layer 22 in each of these embodiments.

Figure 2A:
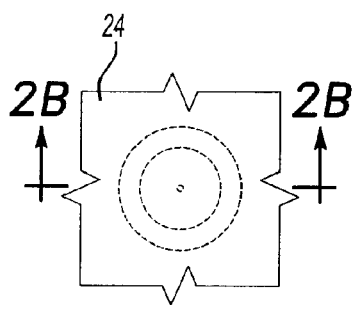
FIGS. 2A-2B through 11A-11B are various views and embodiments of a portion of the tear seam.
Figure 2B:
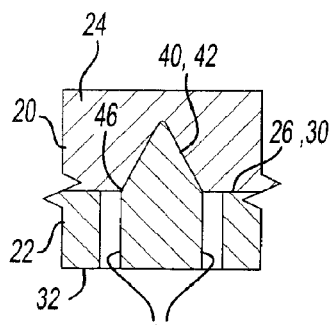

Referring to FIGS. 2A-2B, one exemplary embodiment of portion of a tear seam is shown. In this embodiment, the tear seam includes an indentation 40, a protrusion 42, and an aperture 44 that intersect at a common edge 46. The indentation 40 and protrusion 42 have generally conical shapes that narrow in a direction extending from the second surface 26 toward the first surface 24 to help concentrate force to sever the first layer 20 as previously described. The aperture 44 may be provided near the indentation 40 and/or protrusion 42 and may extend around at least a portion of the protrusion 42.

Figure 3A:
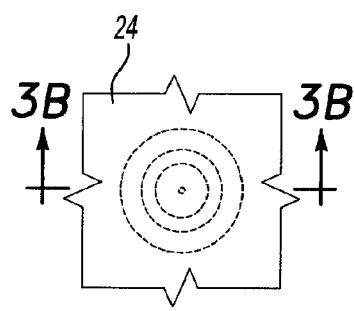
Figure 3B:
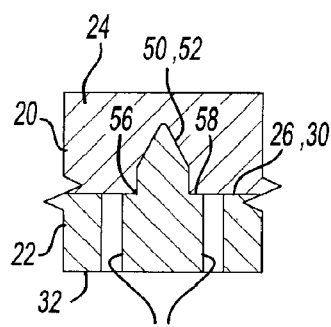

Referring to FIGS. 3A-3B, a variation of the embodiment of FIGS. 2A-2B is shown. In this embodiment, the indentation 50 and protrusion 52 are generally conical. However, the indentation 50, protrusion 52, and aperture 54 do not intersect at a common edge. Instead, the aperture 54 is spaced apart from the intersection 56 of the indentation 50 and the protrusion 52, thereby creating an connecting portion 58 that extends between the intersection 56 and the aperture 54.

Figure 4A:
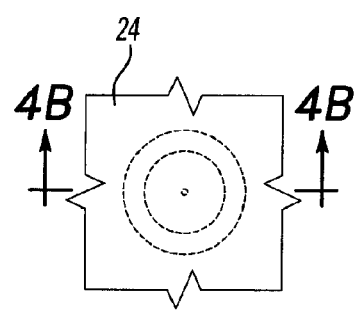
Figure 4B:
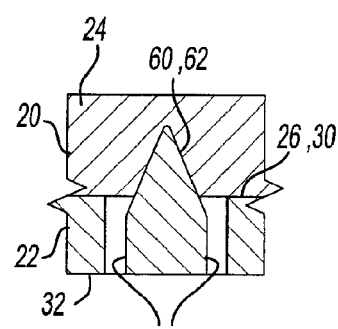

Referring to FIGS. 4A-4B, another variation of the embodiment of FIGS. 2A-2B is shown. In this embodiment, the indentation 60 and protrusion 62 are generally conical. However, the surface of the protrusion 62 extends past the second surface 26 and into the aperture 64.

Referring to FIGS. 5A-5B, an embodiment is shown having an indentation 70, a protrusion 72, and an aperture 74. The indentation 70 includes a convex surface. The protrusion 72 includes a concave surface. The indentation 70 and protrusion 72 narrow in a direction extending from the second surface 26 toward the first surface 24 to help concentrate force as previously described Referring to FIGS. 6A-6B, an embodiment is shown having an indentation 80, a protrusion 82, and an aperture 84. The indentation 80 and protrusion 82 are generally symmetrical and have a pyramid shape that narrows in a direction extending from the second surface 26 toward the first surface 26 to help concentrate force as previously described. An aperture 84 may be disposed proximate one or more sides of the protrusion 82. In the embodiment shown, the aperture 84 extends around the protrusion 82.

Referring to FIGS. 7A-7B, an embodiment is shown having an indentation 90, a protrusion 92, and an aperture 94. The indentation 90 and protrusion 92 have generally triangular cross-sections that narrow in a direction extending from the second surface 26 toward the first surface 24 to form an edge 96 having any suitable length. Force is concentrated against the edge 96 to help concentrate force for severing the first layer 20.

Referring to FIGS. 8A-8B, an embodiment is shown having an indentation 100, a protrusion 102, and an aperture 104. The indentation 100 and protrusion 102 have mating asymmetrical triangular cross-sections that narrow in a direction from the second surface 26 toward the first surface 24 to form an edge 106 that helps concentrate force as previously described. One side of the indentation 100 and protrusion 102 may include a side that extends generally perpendicular from the second surface 26 to the edge 106.

Referring to FIGS. 9A-9B, an embodiment is shown having an indentation 110, a protrusion 112, and an aperture 114. The indentation 110 and protrusion 112 narrow in a direction extending from the second surface 26 toward the first surface 24 and include a combination of generally planar and non-planar surfaces. More specifically, a planar surface 116 intersects a nonplanar surface 118 along an edge 120 to concentrate force as previously described. One or more apertures may be disposed proximate the planar surface 116 and/or non-planar surface 118.

Referring to FIGS. 10A-10B, an embodiment is shown having an indentation 130, a protrusion 132, and an aperture 134. The indentation 130 and protrusion 132 narrow in a direction extending from the second surface 26 toward the first surface 24 and include a combination of generally planar and non-planar surfaces. First and second generally planar surfaces 136,138 may extend generally perpendicular to the second surface 26. A non-planar surface 140 intersects the first generally planar surface 136 at a first edge 142 and intersects the second generally planar surface 138 at a second edge 144. The first and second edges 142,144 help concentrate force against two locations on the first layer 20 to help sever the first layer 20 as previously described. The non-planar portion of the indentation 130 may be convex and the non-planar portion of the protrusion 132 may be concave.

Figure 11A:
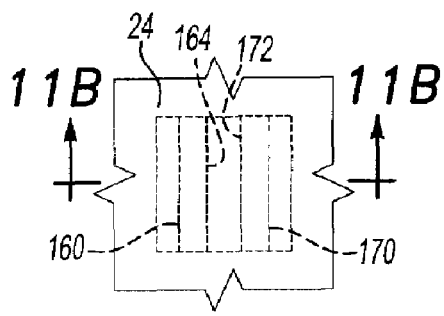
Figure 11B:
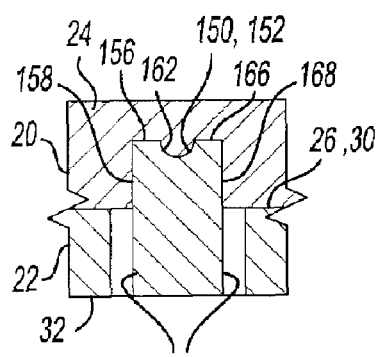

Referring to FIGS. 11A-11B, an embodiment is shown having an indentation 150, a protrusion 152 and an aperture 154. The indentation 150 and protrusion 152 include a combination of generally planar and non-planar surfaces. A first connecting surface 156 intersects a first generally planar surface 158 at a first edge 160 and intersects a non-planar surface 162 at a second edge 164. Similarly, a second connecting surface 166 intersects a second generally planar surface 168 at a third edge 170 and intersects the non-planar surface 162 at a fourth edge 172. The edges 160,164,170,172 cooperate with connecting surfaces 156,166 to help concentrate force to sever the first layer 20 as described above.

Figure 12:
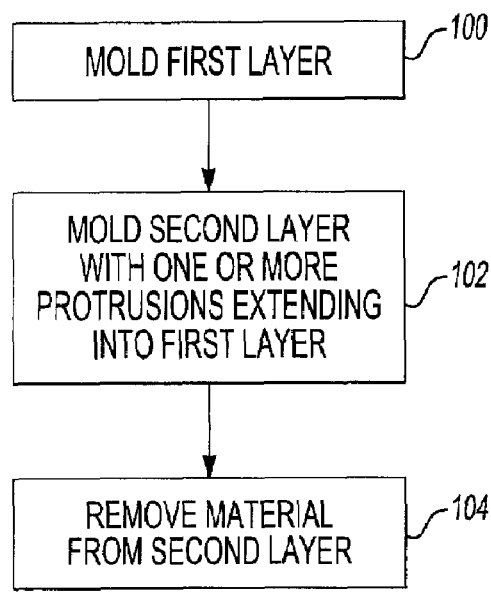
FIG. 12 is a flowchart of one embodiment of a method of making a trim panel according to the present invention.

Referring to FIG. 12, a flowchart of a method for making a trim panel is shown. For clarity, the method is described with reference to FIGS. 13A-13C, which graphically depict an exemplary trim panel made in accordance with the method of FIG. 12.

Figure 13A:
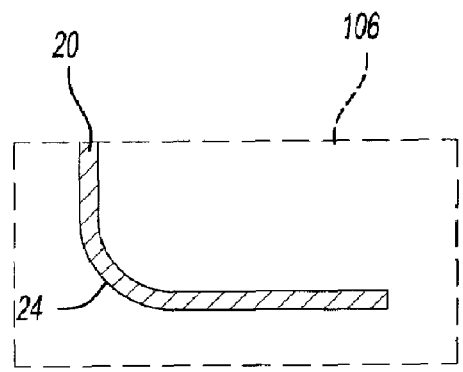
FIGS. 13A-13C are graphical representations of the method of FIG. 12.

At 100, the method begins by molding the first layer 20 (see FIG. 13A). The first layer 20 may be molded in any suitable manner. For example, the first layer 20 may be injection molded by providing material into a cavity of a mold 106 in a manner known by those of skill in the art. In addition, the mold 106 may be configured to provide the first surface 24 with texturing and may be molded having a desired color.

Figure 13B:
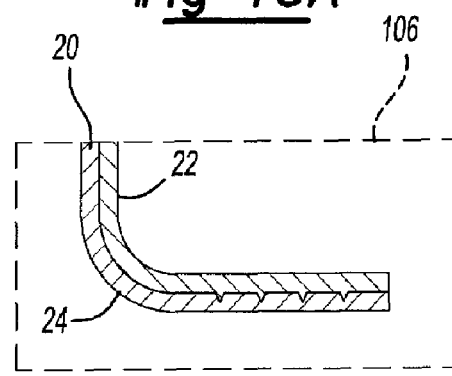

At 102, the second layer 22 is molded proximate the first layer 20 (see FIG. 13B). The second layer 22 may be provided using a multi-shot molding process, such as a two-shot molding process in which the first and second layers 20,22 are formed in a common mold to simplify fabrication. The second layer 22 may be molded with one or more protrusions that extend into the first layer 20.

Figure 13C:
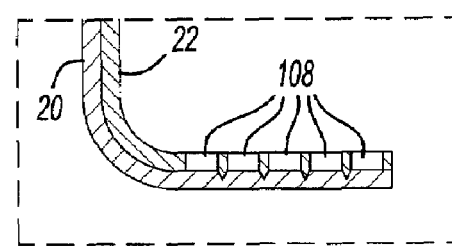

At 104, one or more apertures 108 may be provided by removing material from the second layer 22 proximate one or more of the protrusions (see FIG. 13C). The material may be removed in any suitable manner, such as with a laser, hot knife, water jet, or a cutting tool. The material may be removed while the first and second layers 20,22 are disposed in the mold 106 or after the first and second layers 20,22 are removed from the mold 106. In addition, the material may be removed such that the apertures 108 extend partially or completely through the second layer 22 as previously described.

Figure 14:
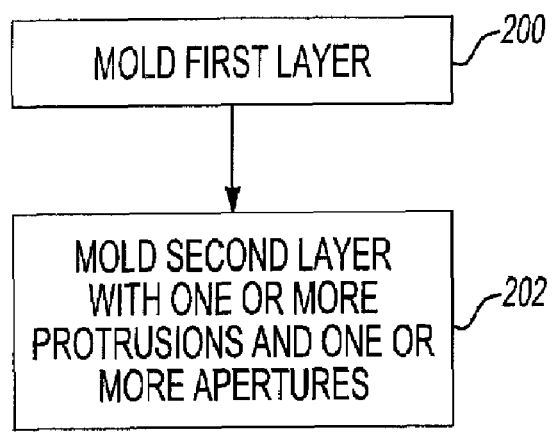
FIG. 14 is a flowchart of another embodiment of a method of making a trim panel according to the present invention.

Referring to FIG. 14, another flowchart of a method for making a trim panel is shown. For clarity, the method is described with reference to FIGS. 15A and 15B, which graphically depict an exemplary trim panel made in accordance with the method of FIG. 14.

Figure 15A:
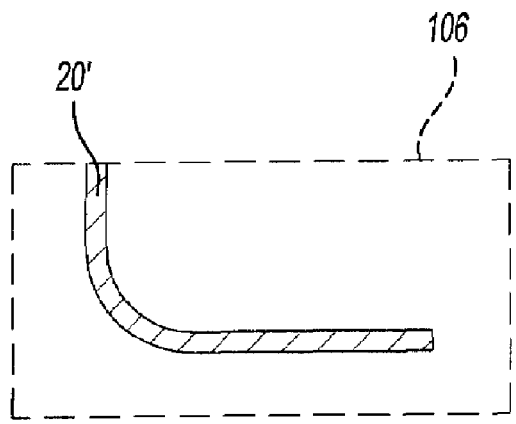
FIGS. 15A-15B are graphical representations of the method of FIG. 14.

At 200, the method begins by molding a first layer 20' (see FIG. 15A). For example, the first layer 20' may be injection molded by providing material into a cavity of a mold 106 as previously described.

Figure 15B:
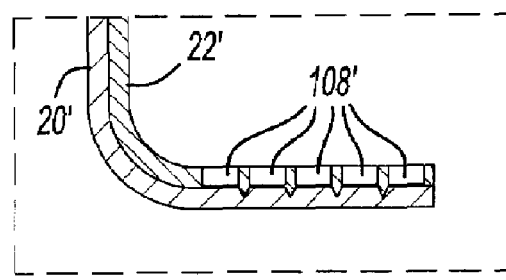

At 202, the second layer 22' is molded proximate the first layer 20' with one or more protrusions and one or more apertures 108' (see FIG. 15B). The second layer 22' may be molded with one or more protrusions that extend into the first layer 20' as previously described. In addition, one or more apertures 108' may be provided near one or more protrusions when the second layer 22' is molded. The apertures 108' may be provided such that they do not extend entirely through the second layer 22' as shown. Moreover, the apertures 108' may be tapered slightly such to accommodate die draw in a manner known by those skilled in the art. As previously described, the second layer 22' may be provided using a multi-shot molding process to simplify fabrication In at least one embodiment, the present invention permits a multi-layered trim panel to be provided with a tear seam that does not require the removal of material from a plurality of layers, thereby helping improve durability and/or reducing visibility of the tear seam. Moreover, at least one embodiment of the present invention provides support for the indentations or reduced thickness portions of a supported layer, thereby improving durability of the trim panel and/or severing performance. Moreover, the present invention allows a tear seam to be provided in various configurations to achieve a desired level of performance. Furthermore, the present invention permits a tear seam and/or a deployment door to be provided without the use of an additional support panel, thereby reducing cost and complexity.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A trim panel for a motor vehicle, comprising:
    a first layer comprising:
        a first surface, and
        a second surface disposed opposite the first surface, the second surface having an indentation extending toward and spaced apart from the first surface; and
    a second layer comprising:
        a third surface disposed adjacent to the second surface, the third surface including a protrusion disposed adjacent to the indentation and an aperture disposed proximate the protrusion, and
        a fourth surface disposed opposite the third surface;
    wherein the aperture extends from the third surface to the fourth surface and is disposed around the protrusion and the protrusion concentrates force against the indentation to sever the first layer when sufficient force is applied to the fourth surface.

2. The trim panel of claim 1 wherein the indentation and protrusion further comprise mating planar surfaces.

3. The trim panel of claim 1 wherein the indentation and protrusion further comprise mating non-planar surfaces.

4. The trim panel of claim 3 wherein the non-planar surface of the indentation is convex and the non-planar surface of the protrusion is convex.

5. The trim panel of claim 1 wherein the indentation further comprises a first planar surface and a first non-planar surface and the protrusion further comprises a second planar surface and a second non-planar surface, the first planar surface being disposed proximate the second planar surface and the first non-planar surface being disposed proximate the second non-planar surface.

6. The trim panel of claim 5 wherein the first planar surface is disposed adjacent to the first non-planar surface and the second planar surface is disposed adjacent to the second non-planar surface.

7. The trim panel of claim 1 wherein the indentation and the protrusion each have an asymmetrical cross-section.

8. The trim panel of claim 1 wherein the indentation and the protrusion each have a symmetrical cross-section.

9. A trim panel for a motor vehicle, comprising:
    a first layer comprising:
        a first surface that forms an exterior surface of the trim panel, and
        a second surface disposed opposite the first surface, the second surface having an indentation extending toward and spaced apart from the first surface; and
    a second layer comprising:
        a third surface disposed adjacent to the second surface, the third surface including a protrusion that mates with the indentation,
        a fourth surface disposed opposite the third surface, and
        an aperture extending from the fourth surface toward the third surface and disposed around the protrusion;
    wherein the protrusion concentrates force against the indentation to sever the first layer when sufficient force is applied to the fourth surface.

10. The trim panel of claim 9 wherein the aperture extends between the third and fourth surfaces.

11. The trim panel of claim 9 wherein the aperture includes a bottom surface spaced apart from the third surface.

12. The trim panel of claim 9 wherein the protrusion narrows to a point at a location disposed furthest from the fourth surface.

13. The trim panel of claim 9 wherein the protrusion terminates at an edge at a location disposed closest to the first surface of the first layer.

14. The trim panel of claim 9 further comprising:
a set of indentations, each member of set of indentations being spaced apart from another member of the set of indentations,
a set of protrusions, each member of the set of protrusions being spaced apart from another member of the set of protrusions and disposed adjacent to a member of the set of indentations, and
a set of apertures disposed such that at least one member of the set of apertures is disposed near a member of the set of protrusions;
wherein the set of indentations, set of protrusions, and set of apertures cooperate to define a tear seam that severs when sufficient force is applied to the fourth surface proximate the set of apertures.

15. A method for making a trim panel having a tear seam, the method comprising:

molding a first layer having a first surface and a second surface disposed opposite the first surface;

molding a second layer having a third surface disposed proximate the second surface and a fourth surface disposed opposite the third surface, the third surface including a protrusion that extends into the second surface to form an indentation; and providing an aperture in the second layer that encompasses the protrusion, the aperture extending from the fourth surface toward the third surface.

16. The method of claim 15 wherein the aperture is provided when the second layer is molded.

17. The method of claim 16 wherein the aperture is provided with a bottom surface spaced apart from the third surface.

18. The method of claim 15 wherein the aperture is provided by removing material from the second layer after the second layer is molded.

19. The method of claim 18 wherein material is removed from the second layer when the second layer is disposed in a mold in which the first and second layers are molded.

20. The method of claim 18 wherein material is removed from the second layer after the second layer is removed from a mold in which the first and second layers are molded.

* * * * *

UNITED STATES PATENT AND TRADEMARK OFFICE
CERTIFICATE OF CORRECTION

PATENT NO. : 7,384,061 B2
APPLICATION NO. : 11/160889
DATED : June 10, 2008
INVENTOR(S) : Charles Haba et al.

It is certified that error appears in the above-identified patent and that said Letters Patent is hereby corrected as shown below:

Column 6, Line 25, Claim 1:

Delete "is disposed around" and insert -- surrounds --

Column 6, Line 25, Claim 1:

After "protrusion" insert:

-- to completely separate the protrusion from a remainder of the second layer --

Column 6, Line 64, Claim 9:

After "surface" delete "and disposed around the protrusion" and insert:

-- , wherein the aperture encompasses the protrusion to separate the protrusion from a remainder of the second layer --.

Column 8, Line 10, Claim 15:

After "protrusion" insert:

-- and separates the protrusion from a remainder of the second layer --.

Signed and Sealed this

Twenty-third Day of September, 2008

JON W. DUDAS
*Director of the United States Patent and Trademark Office*